United States Patent [19]

Blincow et al.

[11] Patent Number: 4,755,677

[45] Date of Patent: Jul. 5, 1988

[54] TANK CONTENT GAUGING SYSTEM

[75] Inventors: Donald W. Blincow, Pomona; John J. Mahoney, San Bernardino; Jerold H. McCormick, Montclair, all of Calif.

[73] Assignee: General Nucleonics, Inc., Pomona, Calif.

[21] Appl. No.: 764,581

[22] Filed: Aug. 12, 1985

[51] Int. Cl.[4] .............................................. G01F 23/00
[52] U.S. Cl. .................................. 250/357.1; 250/308
[58] Field of Search .................. 250/357.1, 336.1, 308, 250/358.1

[56] References Cited

U.S. PATENT DOCUMENTS 2,960,607 11/1960 Kohl .................................. 250/357.1
3,486,374 12/1969 Wright ............................. 250/357.1
3,501,632 3/1970 Kaminskas et al. ............... 250/357.1

Primary Examiner—Janice A. Howell
Attorney, Agent, or Firm—Harris, Kern, Wallen & Tinsley

[57] ABSTRACT

A tank content gauging system including a plurality of radiation sources and a radiation detector mounted at a fuel tank, with the radiation detector positioned for receiving radiation from the sources and for producing an output which is an electrical analog of the detected radiation, a register for storing the detector output, a telemetry-on-demand switching unit for starting and stopping the detector operation from a point distant from the tank, a transceiver for sending "on" and "off" commands to the switching unit and receiving telemetry data from the register, a computer having the telemetry data and reference data as inputs for producing an output representing the quantity of fuel in the tank, and a display for indicating the quantity of fuel in the tank.

43 Claims, 2 Drawing Sheets

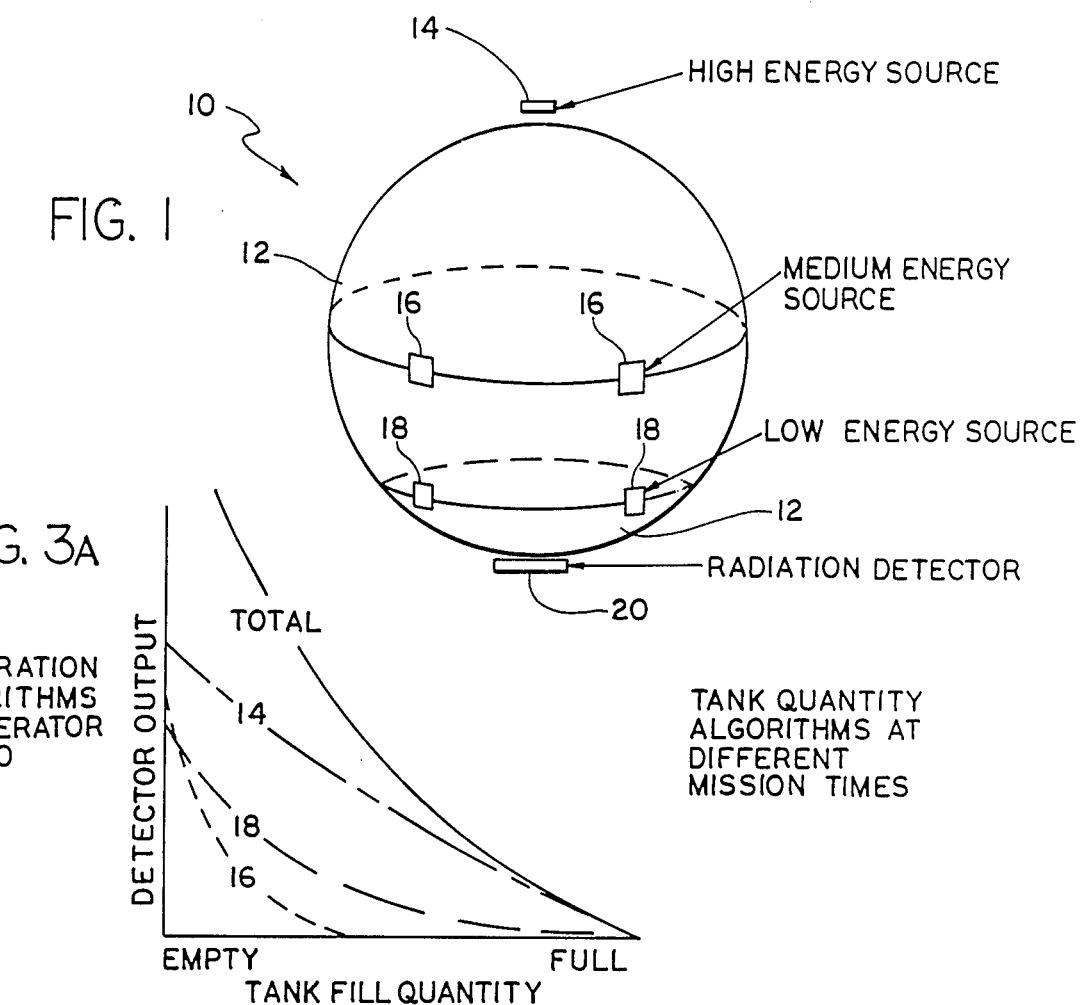
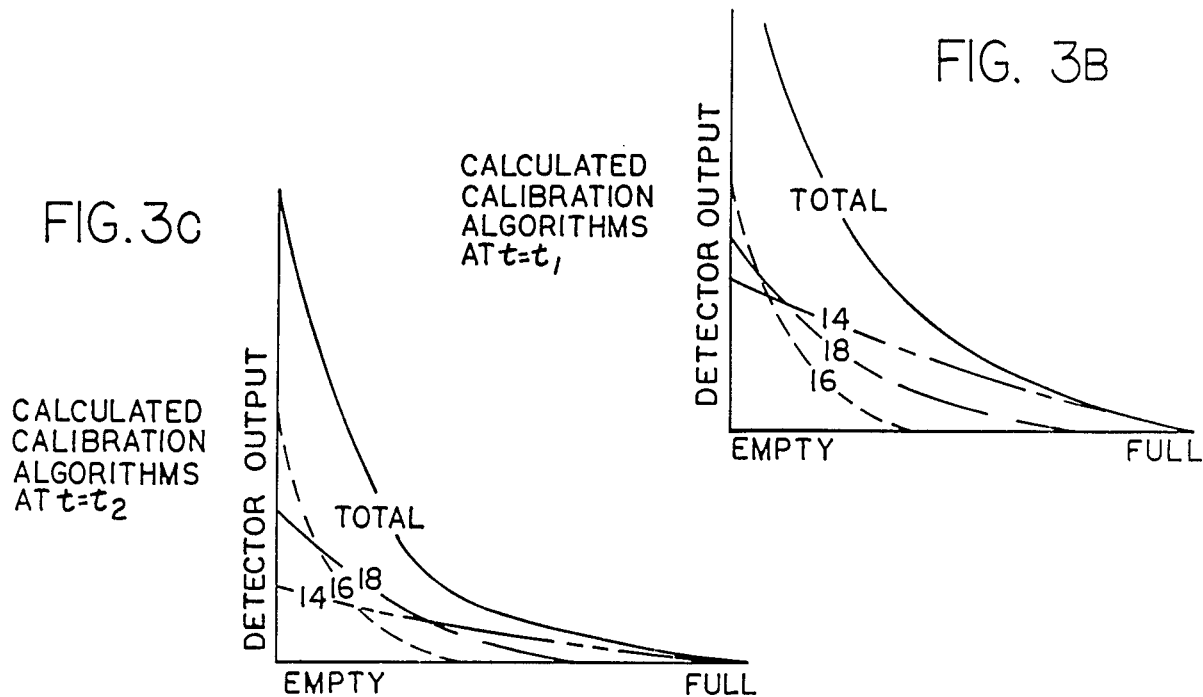

TANK CONTENT GAUGING SYSTEM

BACKGROUND OF THE INVENTION

This invention relates to a method and apparatus for determining the quantity of material in a tank, such as a satellite fuel tank, by radiation detecting means.

It is known to measure the quantities of the liquid within a tank, by using radiation sources positioned at the tank and a detector positioned for receiving radiation from the sources which has passed through the contents of the tank and is thereby attenuated. The greater the amount of the contents in the tank, the larger the attenuation will be of the detected radiation.

In most devices presently in use, radiation sources all of the same energy output and half-life are utilized. If a high-energy radiation source is used, the percentage attenuation of the energy output decreases greatly when the fuel level of the tank is low, leading to less accurate measurement of the quantity of fuel. Alternatively, if a low-energy radiation source is used, the attenuation of the radiation therefrom is relatively large when the fuel level of the tank is high, again leading to inaccuracy in the measurement of the contents. Devices in the prior art which utilize radiation sources of different energy outputs and half-lives require separate detectors for each radiation source.

If is an object of this invention to provide a new and improved method and apparatus for gauging the contents of a tank utilizing radiation sources of different energy outputs and half-lives for improved accuracy.

It is another object of this invention to provide such a method and apparatus utilizing a single radiation detector for detecting radiation from sources of different energy outputs and half-lives.

It is yet another object of this invention to provide such a method and apparatus wherein erroneous background radiation is eliminated from the measurement of the contents of the tank.

It is a further object of this invention to provide such a method and apparatus wherein calibration data are generated and stored which relate to detected radiation as a function of the quantity of material in the tank.

Other objects, advantages, features and results will more fully appear in the course of the following description.

SUMMARY OF THE INVENTION

In the method and apparatus of the present invention, at least two and preferably three radiation sources are mounted adjacent a tank having contents such as fuel, and a radiation detector is mounted adjacent the tank for receiving radiation from the radiation sources, and providing an output which is related to the quantity of the material in the tank. One of the radiation sources preferably includes a high energy, short half-life radioactive substance, another source preferably includes a low energy, long half-life radiation substance, and another source preferably includes a radioactive substance with an intermediate energy out and intermediate half-life. A background radiation detector is preferably provided for eliminating background radiation error from the detector output for a more accurate determination of the contents of the tank.

BRIEF DESCRIPTION OF THE DRAWINGS

FIG. 1 is a side view of a tank including the presently preferred embodiment of the invention;

FIGS. 3A–3C are graphic representation of calibration data (or "tank quantity algorithms") utilized by the presently preferred embodiment of the invention.

DESCRIPTION OF THE PREFERRED EMBODIMENTS

Figure 2:
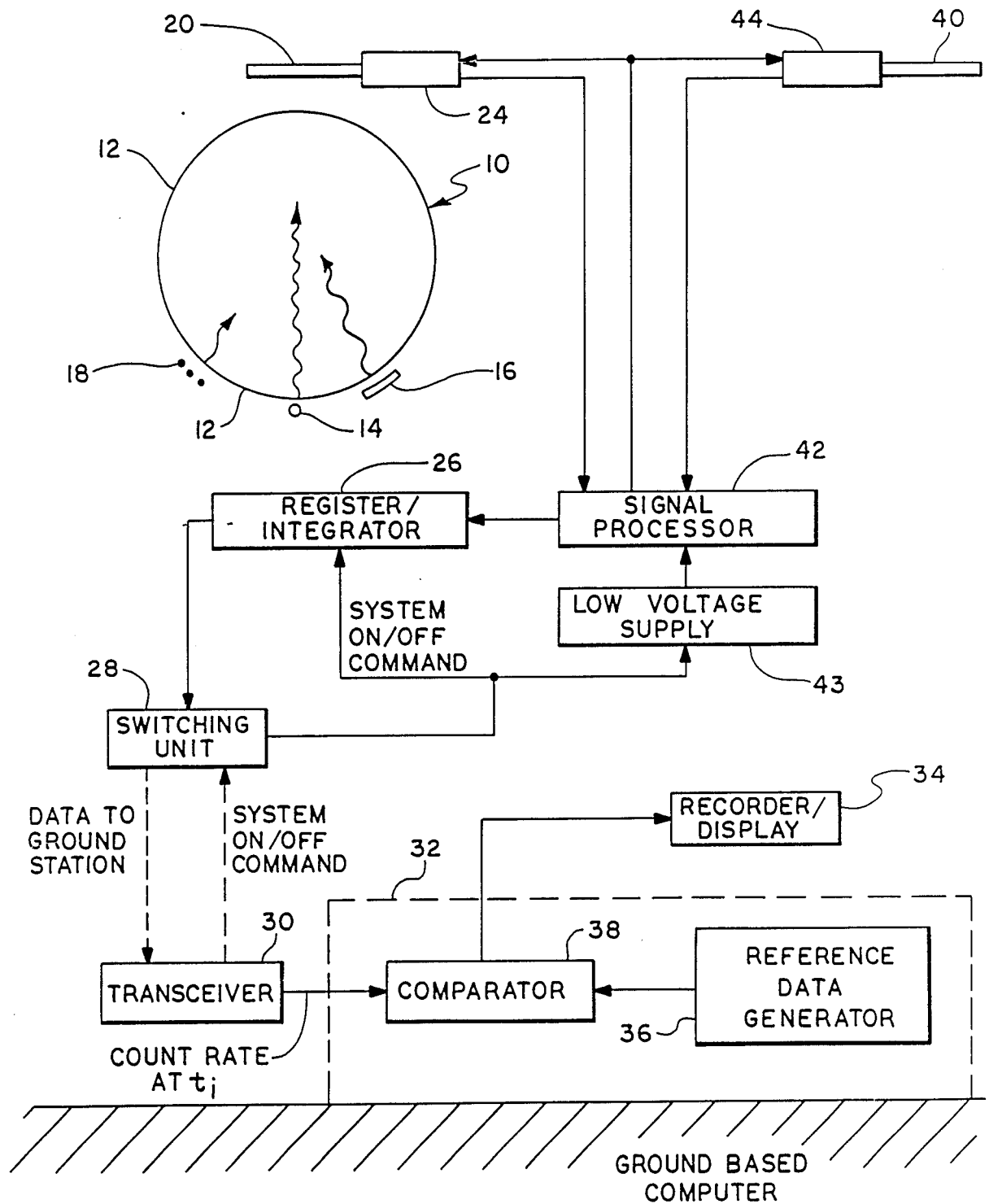
FIG. 2 is a block diagram of the circuitry of the presently preferred embodiment of the invention.

A tank 10, typically a fuel tank having one or more walls 12, is shown in FIG. 1. Radiation sources 14, 16 and 18 are mounted at the wall 12, either within or without the interior of the tank 10. At least one radiation detector 20 is mounted at the wall 12 (again either within or without the interior of the tank 10) in such a position as to receive radiation from the sources 14, 16 and 18, which are positioned such that the radiation therefrom passes through the interior of the tank 10. The radiation source 14 is preferably a high-energy short half-life source such as Co-60; the radiation source 16 is preferably a medium-energy, medium half-life source such as Cs-137 or Kr-85; and the radiation source 18 is preferably a low-energy, long half-life source, such as Am-241. One or more of each of the sources 14, 16 and 18 may be used, as seen in FIG. 1.

The sources 14, 16 and 18 and the detector 20 are positioned at the tank 10 in a relationship which is determined by predicting the fuel distribution of the tank for given fuel levels in a standard process known as "mapping."

FIG. 2 shows a block diagram of a circuit for receiving an output from the radiation detector 20 and for producing an output related to the amount of fuel or other material in the tank 10. This circuit preferably includes: a standard high voltage supply 24 connected to the detector 20; a signal processor 42; a register or integrator 26, which may be an analog register or a digital register, for storing the output of the detector 20 or from the signal processor 42 when used; a conventional telemetry-on-demand switching unit 28 including a radio transceiver; a conventional transceiver 30 including means for sending on/off signals and means for receiving and decoding signals from said switching unit 28; a conventional calculating unit such as a computer 32; and a display unit 34.

As shown in FIG. 2, the high voltage supply 24 provides electrical power to the radiation detector 20. The output of the radiation detector 20 is connected as an input to the register 26 through the signal processor 42, which produces an output which is connected as an input to the switching unit 28. The switching unit 28 has an output which may be an electromagnetic wave (i.e., a radio wave) with information encoded thereon which is obtained from the switching unit input. The wave is provided as an input to the transceiver 30, which has as an output an electrical signal analogous to the switching unit output and relating to the amount of radiation received by the detector 20. The output of the transceiver 30 is provided as an input to the computer 32. The computer output, representing the quantity of material in the tank 10, is displayed and/or recorded by the display means 34.

The computer 32 preferably includes a reference data generator 36 with memory, and a comparator 38.

The system of the present invention is designed for use typically in connection with a fuel tank of a satellite. In order for the system to determine the contents of a satellite tank, the data generator 36 must first be calibrated, which is accomplished as follows.

The source 14 is installed along with the radiation detector 20 as shown in FIG. 1, preferably in the position relative to the tank 10 that will be used in the vehicle. The radiation passing through the tank (i.e. through the interior thereof) from this source produces electrical signals in a standard manner in the detector 20. The voltage outputs of the detector 20 are provided as inputs to the register/integrator 26, which has an output that is a digital signal or analog voltage related to its input. For purposes of calibrating the generator 36, the output of the register 26 may be input directly to the memory of the generator 36, i.e. bypassing the switching unit 28 and the transceiver 30, which are used when remote control is desired. The first data point which is input to the memory of the generator 36 represents the empty signal for the source 14 at time-zero. An increment of fuel is then added to the tank 10 and a second data point is stored in the generator 36 as described above. This process is continued until the tank 10 is full and the accumulated data in the generator represents a time-zero fuel quantity algorithm, i.e. calibration data, for that source material.

The radiation source 14 is then replaced with the radiation source 16 and the above procedure repeated to obtain a time-zero algorithm for the source 16. The procedure is then repeated with the source 18, and the resultant time-zero algorithm is stored in the memory of the generator 36.

The detector 20 may include standard energy discrimination means for discriminating among the radiation received from the respective sources 14, 16 and 18. In this case, the signal processor 42 preferably includes a standard window discriminator for separating the outputs of the different sources; and the calibration data for the different sources may be obtained simultaneously with all sources installed.

The time-zero algorithms are summed together in the generator 36 to produce a total, time-zero algorithm of the detector output as a function of tank quantity with all sources installed. However, the output of each radiation source decreases as the radioactive material decays, and as discussed above, each of the sources preferably has a different decay rate. Thus, the generator 36 is used to correct each separate algorithm for the decay of the respective source before it sums the algorithms.

The average intensity of radiation from a source decreases with time, obeying the following well-known decay relation:

$$I = I_o e^{-\lambda t} \qquad \text{Eq. (1)}$$

where:
t represents time;
$I_o$ and I are the intensities at times $t=0$ and t, respectively; and
$\lambda$ is the decay constant for a given isotope.

If $t_{\frac{1}{2}}$ is the half-life of a given isotope, then by definition $I(t=t_{\frac{1}{2}}) = \frac{1}{2}I_o$, and $$\tfrac{1}{2}I_o = I_o e^{-\lambda t_{\frac{1}{2}}}$$

or $$\lambda = 0.693/t_{\frac{1}{2}}. \qquad \text{Eq. (2)}$$

Given the half-life $t_{\frac{1}{2}}$ of a source, then, the decay constant $\lambda$ is precisely determined by Eq. (2); and from Eq. (1) above, the generator 36 is used to compute a correction factor for each source material for any time t. The resultant time-corrected calibration data are represented graphically in FIGS. 3A–3C, wherein the curves marked 14, 16 and 18 correspond to the output at times $t=0$, $t=t_1$ and $t=t_2$ of the sources 14, 16 and 18, respectively, and the curves marked "TOTAL" represent the totals of the individual output curves.

The time-zero algorithms discussed above are most accurately representative of the fuel quantity for the gravity condition (or "g condition") that was actually used in the calibration. Although many tanks have been "mapped" so that the detector output is relatively independent of the g condition (particularly for oil tanks on jet fighter aircraft where violent maneuvers are anticipated and where an on board readout is required), this is unnecessary for satellite and space vehicle tanks. The generator 36 can be calibrated separately for each of the two expected satellite conditions, namely prelaunch g condition (normal earth surface gravity), and a zero or very low g condition when the satellite is in orbit. The generator 36 is switched to the correct calibration data for the given g condition.

Mapping and calibration for spin stabilized satellites must take into account the centrifugal force vector for each tank. With the tank orientated so gravity forces act along the same axis as the centrifugal forces will, the simulation is quite close.

In the absence of gravitational or similar forces (zero g), surface tension forces cause the fluid to "wet" the tank walls and other internal structure. As fluid is removed from the tank, a spherical ullage bubble (or bubbles) will start to grow near the center of the tank, then gradually deform from its spherical shape—conforming more to the shape of the tank cavity as the bubble gets nearer to the tank walls. This general description can vary considerably depending on the tank material, the fluid characteristics and the design of the fluid collection devices in the tank. Therefore, the zero g mapping and generator calibration usually are carried out by taking into account fluid distribution characteristics for zero g, which are supplied by the tank designer. The actual mapping and calibration can be done empirically using laboratory zero g simulation, by computer simulation, or by a combination of both. In the laboratory, the ullage bubble is usually simulated by suspending an elipsoid of low density material like styrofoam in a tank filled with fluid. Ideally, of course, calibration and mapping are carried out in actual zero g flight.

In general, there will be an unknown quantity of fuel in the tank 10. An "on" command is sent from the transceiver 30 to the switching unit 28, at which point the high voltage supply 24 is activated, causing the radiation detector 20 to start detecting radiation from the sources 14, 16 and 18. Since the detector 20 normally will not include a means for energy discrimination, the output of the detector 20 is a voltage related to the aggregate amount of radiation from the sources 14, 16 and 18. The voltage register 26 has the detector output as its input, and has an analog or digital output which relates to the input. Thus, the voltage register output may be either a digitally-encoded electrical signal or an analog signal, in either case representing the amount of radiation received at the detector 20. A typical analog register range is 0 to 5 volts DC.

The output of the register 26, representing a accumulated detector output is transmitted by the switching unit 28 to the transceiver 30, and is input to the computer 32.

The computer input is compared by the comparator 38 with the calibration data contained in the memory of the reference data generator 36. The three sets of calibration data are first added by the generator 36 to produce a set of data representing the aggregate radiation expected from the three sources 14, 16 and 18 as a function of fuel content in the tank 10, as shown graphically in FIGS. 3A–3C. The comparator 38 then compares the computer input to this set of data, thereby determining the actual fuel content of the tank 10. The comparator 38 output is therefore a signal representing the quantity of fuel in the tank 10, and is input to the display means 34.

The high voltage supply may then be switched off by means of an "off" command sent to the switching unit 28 from the transceiver 30, which stops the detection of radiation, thus conserving energy for the high voltage supply 24.

When the tank 10 is near full, the radiation passing through its contents is greatly attenuated, which makes the signal from the high energy source 14 predominate. As the fuel in the tank 10 decreases, however, the radiation is attenuated less and less, so that at low fuel levels the radiation from the high energy source is attenuated only by a very small percentage. Thus, the low-energy source 18 is utilized for purposes of measuring low fuel content, so that the attenuation of its radiation is large relative to the total energy output of the source 18. The usefulness of the medium energy source 16 is greatest when the tank is approximately half full.

The source 14 preferably has a short half-life, such that when the fuel level in the tank 10 has decreased by a large percentage of the initial amount, the emission rate of the source 14 will also have decreased by a large amount, so that the contribution to the detector input from the source 14 will be a small percentage of the total. Similarly, the low-energy source 18 preferably has a long half-life, for measuring low fuel content at later times, and the medium energy source 16 preferably has an intermediate half-life.

Since the energy outputs of the radiation sources 14, 16 and 18 naturally decay over time, as discussed above, the memory of the reference data generator 36 preferably also includes data representing the half-lives of the sources for adjusting the calibration data to decrease with the passage of time, as shown in FIGS. 3A–3C. Thus, the generator 36 preferably also includes a timer, which should have as time zero the time at which the calibration data are inout to the memory. When at some time later $t_1$ a user of the system wishes to know the amount of fuel in tank 10, the generator 36 adjusts the data represented in FIG. 3A by taking into account the half-life data which were input at the time $t_1$, in a manner well known in the art. See FIG. 3B. This adjustment for the radioactive decay should be made before the generator 36 adds the three sets of calibration data, as shown in FIGS. 3B and 3C, for comparison with the input to the computer 32.

When the system of the invention is used in connection with a satellite, it is preferable that a means for error correction such as background radiation detector 40 be used for eliminating errors due to background radiation. In this embodiment, a signal processor 42 powered from a low voltage 43 supply is also preferably used. The high voltage supply 24 may be connected to the background detector 40, or another high voltage supply 44 may be used.

In operation, when an "on" signal is sent to the switching unit 28, the signal processor 42 and the high voltage supplies 24 and 44 are activated, and the register 26 is set to zero. The radiation detector 20 "reads" the radiation from the sources 14, 16 and 18, and the background detector 40 "reads" the amount of background radiation in the region of the tank 10. The detector 40 is preferably positioned for minimizing the reception of any radiation from the sources 14, 16 and 18. The detector 40 produces a voltage which is an analog of the background radiation, in a manner similar to the detector 20.

The signal processor 42, which is of standard design, may be used in various manners. For instance, the signal processor 42 may be used to subtract the signal output of the background detector 40 from the signal output of the detector 20, with the result being provided as an input to the register 26. Alternatively, the signal processor 42 may multiplex the signals from the detectors 20 and 40, and provide the multiplexed signal as an input to the register 26. Alternatively, the signals from the background detector 40 and the detector 20 on the tank are selected sequentially by the signal processor 42, accumulated in the register 26 and transmitted sequentially to the transceiver 30. In these latter cases, the transceiver 30 preferably includes standard means for subtracting the background radiation signal from the signal obtained from the detector 20. In either case the system of the invention eliminates background radiation from the input of the computer 32, so that the comparator 38 will produce an output accurately representing the quantity of fuel in the tank 10.

If the detector 20 includes a means for energy discrimination, the three signals output from the detector 20 are multiplexed by the signal processor 42. In this embodiment, the input to the computer 32 consists of three signals, which are compared with the three corresponding sets of data in the memory of the generator 36. In other words, the reference data are not added together before being compared by the comparator 38 with the computer input.

The utilization of the several radiation sources 14, 16 and 18 also helps to eliminate any error due to background radiation, since the signal obtained from the radiation detector 20 will be correspondingly higher throughout the life of the satellite, making the relative error due to background radiation proportionately lower.

It will be understood from the foregoing description that the detectors 20 and 40 may either be energy-discriminating detectors, such as scintillators, proportional counters or solid state detectors, or may be Geiger-Mueller tubes or ion chambers which are non-energy-discriminating detectors that tend to be more reliable than energy-discriminating detectors.

A distinct advantage to the preferred embodiment of the instant invention wherein the register 26 is a digital register is that the contents of the tank 10 may be continuously monitored; that is, the digital signal from the register 26, representing the radiation detected by the detector 20 minus any background radiation, may be sent in a continuous stream to the transceiver 30. When the register 26 is an analog register, on the other hand, it preferably includes standard means for continuously accumulating voltage outputs from the signal processor 42 by means of a built-in time constant (which may be the same throughout the life of the satellite), such as intervals of 30 seconds or 1 minute. Using a digital register therefore expands the versatility of the invention, because the same data may be examined for short time effects such as during a docking maneuver, and/or summed over a longer time to reduce statistical variations.

Various modifications of the foregoing description may be had without departing from the spirit and scope of this invention.

We claim:

1. A method for determining the quantity of material in a tank, including the steps of:
    generating calibration data as a function of the quantity of the material in the tank;
    simultaneously directing a first radiation source and a second radiation source through the interior of the tank, with said first source having a first energy level and a first half-life and with said second source having a second energy level and a second half-life, with said first energy level high with respect to said second energy level, and with said first half-life short with respect to said second half-life;
    simultaneously detecting radiation from the first and second radiation sources after passing through the interior of the tank;
    calculating at least one count rate from the radiation detected from the first and second radiation sources;
    comparing the count rate with the calibration data for determining the quantity of the material present in the tank; and
    providing a content output related to the quantity of the material in the tank.

2. The method as defined in claim 1, including the steps of:
    directing a third radiation source through the interior of the tank simultaneously with said first and second sources;
    detecting radiation from the third radiation source after passing through the interior of the tank simultaneously with the detection of radiation from said first and second sources,
    with said third source having a third energy level intermediate said first and second energy levels and a third half-life intermediate and first and second half-lives; and
    calculating the count rate from the radiation detected from the first, second and third radiation sources.

3. The method as defined in claim 1, wherein the generation of calibration data includes the steps of:
    directing the first radiation source through the interior of the tank;
    detecting radiation from the first source after passing through the interior of the tank;
    adding increments of material to the tank;
    after the addition of each increment of material to the tank, detecting radiation from the first radiation source after passing through the interior of the tank; and
    calcluating count rates from the detected radiation.

4. The method as defined in claim 3, including repeating the generation of calibration data utilizing the second radiation source in place of the first radiation source.

5. The method as defined in claim 2, wherein the generation of calibration data includes the steps of:
    directing the first radiation source through the interior of the tank;
    detecting radiation from the first source after passing through the interior of the tank;
    adding increments of material to the tank;
    after the addition of each increment of material to the tank, detecting radiation from the first radiation source after passing through the interior of the tank; and
    calculating count rates from the detected radiation.

6. The method as defined in claim 5, including repeating the generation of calibration data utilizing the second radiation source in place of the first radiation source.

7. The method as defined in claim 6, including repeating the generation of calibration data utilizing the third radiation source in place of the second radiation source.

8. The method as defined in claim 1, including the steps of:
    discriminating between the radiation detected from the first and second radiation sources; and
    calculating a count rate from the radiation detected from each of the first and second radiation sources.

9. The method as defined in claim 1, including the step of detecting background radiation to determine background radiation error.

10. The method as defined in claim 9, including adjusting the output to correct for background radiation error.

11. The method as defined in claim 10, including the step of starting the detection of radiation by means of a signal from a point distant from the tank.

12. The method as defined in claim 11, including the steps of:
    providing a signal related to the detected radiation;
    transmitting the signal to a transceiver; and providing a transceiver output representing the signal for comparison with the calibration data.

13. The method as defined in claim 12, wherein said signal is an analog signal.

14. The method as defined in claim 12, wherein said signal is a digital signal.

15. The method defined in claim 8, including providing an energy-discriminating detector for detecting the radiation.

16. The method defined in claim 1, including providing a non-energy-discriminating detector for detecting the radiation.

17. The method as defined in claim 1, wherein the generation of calibration data includes the steps of:
    directing the first and second radiation sources though the interior of the tank;
    detecting radiation from the first and second sources after passing through the interior of the tank;
    adding increments of material to the tank;
    after the addition of each increment of material to the tank, detecting radiation from the first and second radiation sources after passing through the interior of the tank; and
    calculating count rates from the detected radiation.

18. The method as defined in claim 2, including the steps of:
    discriminating between the radiation detected from the first, second and third radiation sources; and calculating a count rate from the radiation detected from each of the first, second and third radiation sources.

19. The method as defined in claim 2, including the step of detecting background radiation to determine background radiation error.

20. The method as defined in claim 10, including adjusting the output to correct for background radiation error.

21. The method as defined in claim 20, including the step of starting the detection of radiation by means of a signal from a point distant from the tank.

22. The method as defined in claim 21, including the steps of:
providing a signal related to the detected radiation;
transmitting the signal to a transceiver; and
providing a transceiver output representing the signal for comparison with the calibration data.

23. The method as defined in claim 22, wherein said signal is an analog signal.

24. The method as defined in claim 22, wherein said signal is a digital signal.

25. The method defined in claim 18, including providing an energy-discriminating detector for detecting the radiation.

26. The method defined in claim 2, including providing a non-energy-discriminating detector for detecting the radiation.

27. The method as defined in claim 2, wherein the generation of calibration data includes the steps of:
directing the first, second and third radiation sources though the interior of the tank;
detecting radiation from the first, second and third sources after passing through the interior of the tank;
adding increments of material to the tank;
after the addition of each increment of material to the tank, detecting radiation from the first and second radiation sources after passing through the interior of the tank; and
calculating count rates from the detected radiation.

28. The method as defined in claim 4, wherein the generation of calibration data includes the step of adjusting the calculated count rates over time.

29. The method as defined in claim 7, wherein the generation of calibration data includes the step of adjusting the calculated count rates over time.

30. In a gauging system for determining the quantity of material in a tank, the combination of:
first and second radioactive sources for mounting at said tank,
said first radiation source comprising a radioactive source with a first energy level and a first half-life, and said second radiation source comprising a radioactive source with a second energy level and a second half-life, with said first energy level high with respect to said second energy level, and with said first half-life short with respect to said second half-life;
a radiation detector mounted at said tank for detecting simultaneous radiation from said first and second radiation sources; and
a computer for providing an output indicating the quantity of the material in said tank, having as an input the output of said radiation detector.

31. A gauging system as defined in claim 30, wherein said computer includes:
a reference data generator including a memory containing calibration data and means for adjusting said calibration data over time; and
a comparator for comparing said detected radiation with said calibration data.

32. A gauging system as defined in claim 30, including a background detector for determining background radiation error.

33. A gauging system as defined in claim 32, including means for starting and stopping the detection of radiation from a point distant from said tank.

34. A gauging system as defined in claim 33, including:
a register for producing a signal related to the output of said radiation detector;
a transceiver having its output connected to said comparator; and
means for transmitting said signal from said register to said transceiver.

35. A gauging system as defined in claim 34, wherein said register is a digital register for producing a digitized signal.

36. A gauging system as defined in claim 35, wherein said register is an analog register for producing an analog signal.

37. A gauging system as defined in claim 30, including a third radiation source mounted adjacent said tank, with said third source having a third energy level intermediate said first and second energy levels and a third half-life intermediate said first and second half-lives, and with said radiation detector disposed for detecting simultaneous radiation from said first, second and third radiation sources.

38. A gauging system as defined in claim 37, wherein said computer includes:
a reference data generator including a memory containing calibration data and means for adjusting said calibration data over time; and
a comparator for comparing said detected radiation with said calibration data.

39. A gauging system as defined in claim 30, including a background detector for determining background radiation error.

40. A gauging system as defined in claim 39, including means for starting and stopping the detection of radiation from a point distant from said tank.

41. A gauging system as defined in claim 40, including:
a register for producing a signal related to the output of said radiation detector;
a transceiver having its output connected to said comparator; and
means for transmitting said signal from said register to said transceiver.

42. A gauging system as defined in claim 41, wherein said register is a digital register for producing a digitized signal.

43. A gauging system as defined in claim 42, wherein said register is an analog register for producing an analog signal.

* * * * *